United States Patent
Khafagy et al.

(10) Patent No.: US 9,964,090 B2
(45) Date of Patent: May 8, 2018

(54) CONTROL OF A ROLLING STOP-START VEHICLE ENGINE

(71) Applicant: FORD GLOBAL TECHNOLOGIES, LLC, Dearborn, MI (US)

(72) Inventors: Hafiz Shafeek Khafagy, Dearborn, MI (US); Daniel Benjamin Kok, Ann Arbor, MI (US); Ahmed Awadi, Farmington Hills, MI (US); Raed Younis, Dearborn Heights, MI (US); Mohannad Hakeem, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 15/200,461

(22) Filed: Jul. 1, 2016

(65) Prior Publication Data

US 2018/0003143 A1    Jan. 4, 2018

(51) Int. Cl.
| | |
|---|---|
| *F02N 11/08* | (2006.01) |
| *F02D 41/04* | (2006.01) |
| *F02D 41/12* | (2006.01) |
| *B60L 1/00* | (2006.01) |
| *B62D 5/04* | (2006.01) |

(52) U.S. Cl.
CPC ............ *F02N 11/0814* (2013.01); *B60L 1/00* (2013.01); *B62D 5/04* (2013.01); *F02D 41/042* (2013.01); *F02D 41/12* (2013.01); *F02N 11/0862* (2013.01)

(58) Field of Classification Search
CPC ............ F02N 11/0814; F02N 11/0862; F02D 41/042; F02D 41/12; B62D 5/04; B60L 1/00
See application file for complete search history.

(56) References Cited

U.S. PATENT DOCUMENTS

| | | | |
|---|---|---|---|
| 2012/0053771 A1* | 3/2012 | Yoshida | B60L 11/1842 701/22 |
| 2012/0330522 A1* | 12/2012 | Gibson | B60W 10/06 701/70 |
| 2014/0379200 A1* | 12/2014 | Yagi | G07C 5/0808 701/29.4 |
| 2015/0149014 A1 | 5/2015 | Kees et al. | |
| 2015/0211465 A1 | 7/2015 | Bradfield | |

* cited by examiner

*Primary Examiner* — Hung Q Nguyen
*Assistant Examiner* — Xiao Mo
(74) *Attorney, Agent, or Firm* — David B. Kelley; Brooks Kushman P.C.

(57) ABSTRACT

A vehicle includes electric brakes, an engine with a starter, a battery and a controller. The battery has a voltage and is configured to power the starter, the electric brakes, and the controller. The controller is configured to, in response to a speed of the vehicle falling within a specified range without propulsive demand and while the voltage is greater than an upper voltage that varies based on a charge needed to engage the brakes to stop the vehicle, stop the engine.

19 Claims, 3 Drawing Sheets

CONTROL OF A ROLLING STOP-START
VEHICLE ENGINE

TECHNICAL FIELD

This disclosure relates to a rolling start-stop system for a vehicle having a variable battery voltage threshold.

BACKGROUND

Fuel economy of an automobile is an important characteristic. A higher fuel economy rating may make a vehicle more attractive to potential buyers and may help an automotive manufacturer meet fuel economy standards imposed by local governments. For traditional gasoline or diesel vehicles, one method of reducing fuel consumption is the use of a micro-hybrid or start-stop powertrain system that selectively turns its engine off during portions of a drive cycle to conserve fuel. As an example, a controller of a start-stop vehicle can turn the engine off while the vehicle is stopped rather than allow the engine to idle. And, the controller can then restart the engine when a driver steps on the accelerator pedal.

SUMMARY

A method of controlling an engine of a vehicle includes stopping the engine by a controller in response to a speed of the vehicle falling within a specified range in an absence of propulsive demand, and a starter battery voltage being greater than a threshold that varies according to the speed.

A vehicle includes electric brakes, an engine with a starter, a battery and a controller. The battery has a voltage and is configured to power the starter, the electric brakes, and the controller. The controller is configured to, in response to a speed of the vehicle falling within a specified range without propulsive demand and while the voltage is greater than an upper voltage that varies based on a charge needed to engage the brakes to stop the vehicle, stop the engine.

A vehicle includes an engine, a battery, and a controller. The battery has a voltage and is configured to supply power to a starter of the engine. The controller is configured to, in response to a speed of the vehicle falling within a specified range in an absence of propulsive demand while the voltage is greater than an upper voltage profile that is based on a charge needed to control the vehicle, stop the engine.

DETAILED DESCRIPTION

Figure 1:
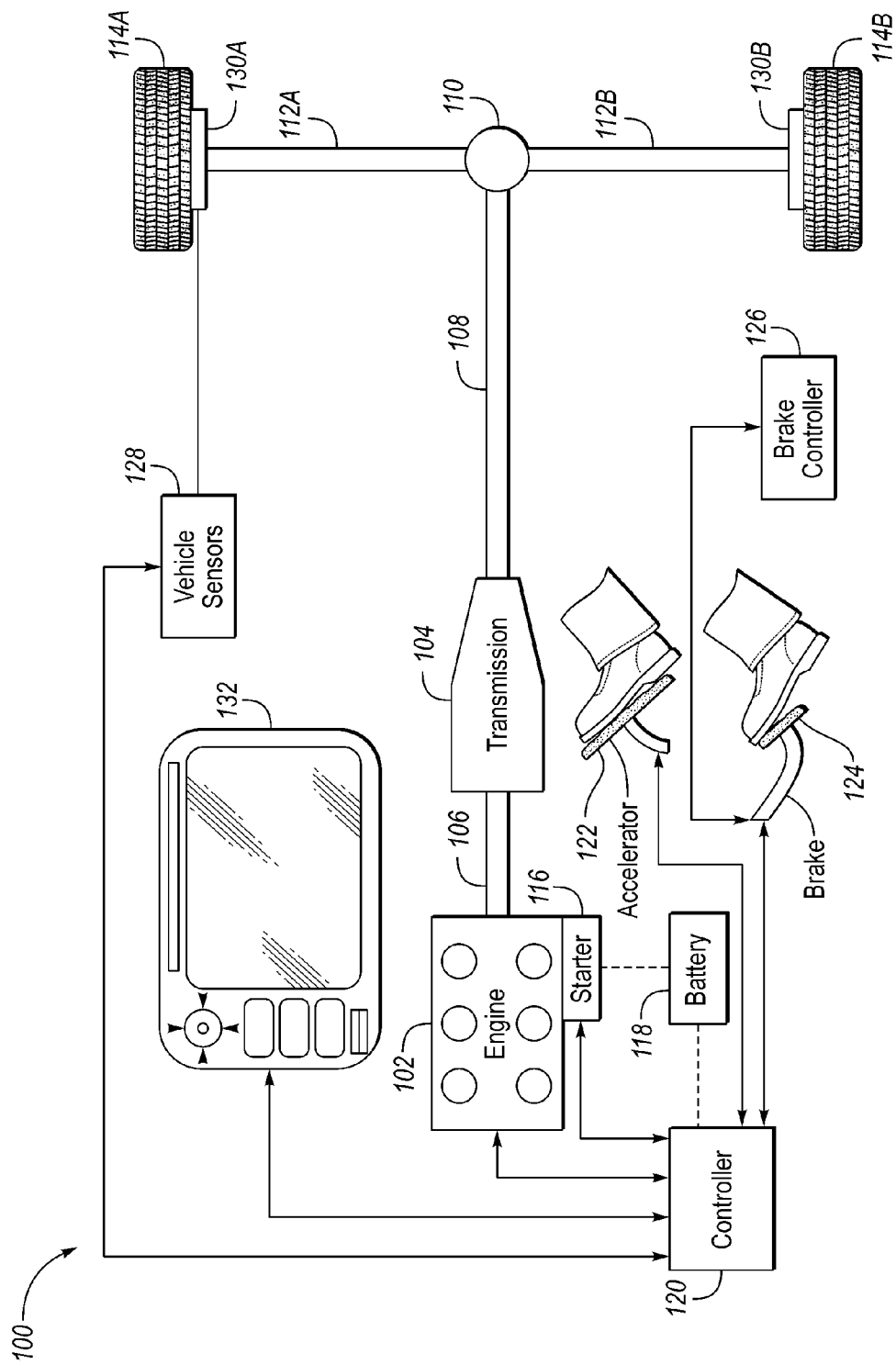
FIG. 1 is a schematic diagram of a vehicle having a start-stop control system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

An objective of the control of a start-stop vehicle powertrain may include stopping an engine such as an internal combustion engine, (e.g., a gasoline engine or a diesel engine). A controller may be used to stops the engine by inhibiting an ignition coil of the engine or by inhibiting the injection of fuel into cylinders of the engine. The controller may stop the engine based on input from vehicle sensors. The signals from the sensors may be indicative of a speed of the vehicle, a force applied to a brake pedal (or absence thereof), a force applied to an accelerator pedal (or absence thereof), an angle of inclination of the vehicle, a weight of the vehicle, or other vehicle characteristic. One other important characteristic of the vehicle is a voltage level of a battery of the vehicle used to start the engine and power electrical automotive systems such as electric power steering (EPS), electric power brakes, electric stability control (ESC), and other vehicle control systems. Along with vehicle control systems are vehicle comfort systems such as seat heaters, an air conditioning system, and a window defroster. An extension of a traditional start-stop is a rolling start-stop system (RSS).

A traditional start-stop system may be configured to auto-stop the engine when the vehicle is not in motion (e.g., 0 mph), a force is applied to the brake pedal, and the voltage level for the vehicle battery is above a threshold. The threshold is selected based on the energy require to start the engine via an electric starter. Once the engine is stopped, the controller may automatically start the engine if the gear selector is in drive and there is an absence of force applied to the brake pedal. In other embodiments of a start-stop vehicle, the controller may be configured to auto-stop the engine when the vehicle is in motion at a speed below a low speed threshold (e.g., 2 mph or 4 mph), a force is applied to the brake pedal, and the voltage level for the vehicle battery is above a threshold. When the vehicle is in motion, the threshold is a higher threshold as the vehicle still requires some power to activate electric power brakes and EPS. Along with the traditional start-stop control system, a vehicle may be configured to start-stop the engine when the vehicle is in motion above a lower threshold. This system is also referred to as a rolling start-stop system (RSS).

An RSS may have additional benefits such as an improved fuel economy rating, improved vehicle emissions, and reducing engine noise. These benefits may be in addition to the improvements from a conventional start-stop system. An RSS allows the engine to auto-stop at a higher vehicle speed once a driver applies the brakes and the vehicle speed is less than an upper vehicle speed threshold. For example, the use of an RSS may increase the fuel economy by 2.4% and reduce the carbon emission by ≈9 $CO_2$ g/mi. In order for RSS to combine the above benefits of increased fuel economy and reduced carbon emissions without impacting drivability and the noise associated therewith, a reliable and stable power supply is required to operate critical and safety components while the engine is Auto-Stopped.

Producing energy by the engine only when needed/required is one of the main approaches to maximizing fuel economy while minimizing emissions in vehicles equipped with internal combustion engines. Accordingly, RSS systems are being considered for implementation across a range of modern vehicles for all of the world's key markets. A RSS system may include a battery system that may be implemented a single battery, dual batteries, any number of batteries. The battery system may have an operating voltage approximately equal to a standard vehicle battery (i.e., 12 Volts) or may operate at other voltages (e.g., 24V, 48V, etc.) RSS systems may utilize any combination of same or different technologies of batteries or power sources such as Lead Acid, Enhanced Flooded (EFB), Absorbent Glass Mat (AGM), LI-Ion or any other battery technology.

One of the challenges with implementing RSS technology in vehicles is the control of electric systems. Here, a controller monitors and adjusts the power system to ensure enough power is available when required. The controller provided power management is critical to ensure that steering assist is available at all the time and to prevent any potential locking of the steering during vehicle motion. Also, the controller maintains full brake functionality to reduce delays in activation.

Referring to FIG. 1, a micro-hybrid vehicle 100 (also known as a start-stop vehicle) includes an engine 102 and a transmission 104. A crankshaft of the engine 102 is drivably connected to the transmission input shaft 106 in order to transmit power from the engine to the transmission. The transmission 104 includes an output shaft 108 that is drivably connected to a differential 110. The differential 110 selectively provides power to the driven wheels 114A and 114B via one or more axles—such as half shafts 112A and 112B. In some embodiments, the differential 110 is disposed within the transmission housing. The vehicle 100 also includes an engine-starter motor 116 that is configured to rotate the crankshaft to turn-over the engine 102 in response to an engine-start signal from the controller 120. The engine-starter motor 116 may be an enhanced starter motor that is specifically designed for the increased duty cycle associated with a micro-hybrid vehicle. The starter 116 is powered by a battery 118, which may be a 12 volt battery, 24-volt battery, 48-volt battery or other low voltage battery or high-voltage battery. A low voltage battery is a battery with a DC voltage less than 100 Volts, a high voltage battery is a battery with a DC voltage equal to or greater than 100 Volts. In some embodiments, the engine may include multiple starter motors. A first starter motor may engage a ring gear of the flywheel to turn the engine over. A second motor may connect to the crankshaft pulley by belt, chain, or other means known in the art.

An accelerator pedal 122 provides operator input to control a speed of the vehicle 100. The pedal 122 may include a pedal-position sensor that provides a pedal-position signal to the controller 120, which provides control signals to the engine 102.

A brake pedal 124 provides operator input to control the brakes of the vehicle. The brake controller 126 receives operator input through a brake pedal 124, and controls a friction brake system including wheel brakes 130A and 130B, which is operable to apply a braking force to the vehicle wheels such as vehicle wheel 114A and vehicle wheel 114B. The pedal 124 may include a pedal-position sensor that provides a pedal-position signal to the controller 120. The vehicle may include an electric-parking brake that is in communication with the controller 120. The controller 120 is programmed to automatically engage the parking brake when desired.

The controller 120 may be a plurality of controllers that communicate via a serial bus (e.g., Controller Area Network (CAN), FlexRay, Ethernet, etc.) or via dedicated electrical conduits. The controller generally includes any number of microprocessors, microcontrollers, ASICs, ICs, volatile (e.g., RAM, DRAM, SRAM, etc.) and non-volatile memory (e.g., FLASH, ROM, EPROM, EEPROM, MRAM, etc.) and software code to co-act with one another to perform a series of operations. The controller may also include predetermined data, or "look up tables" that are based on calculations and test data, and are stored within the memory. The controller may communicate with other vehicle systems and controllers over one or more wired or wireless vehicle connections using common bus protocols (e.g., CAN, LIN, Ethernet, etc.). Used herein, a reference to "a controller" refers to one or more controllers.

As noted above, embodiments of the present invention include a control system for controlling a start-stop system for an engine in a vehicle, such as the engine 102 and the vehicle 100. Such a control system may be embodied by one or more controllers, such as the controller 120. One goal of a vehicle start-stop system is to automatically stop the engine under certain conditions, while restarting it automatically when conditions change. This provides greater fuel economy and reduced emissions.

In some start-stop systems, the engine may be automatically stopped (autostopped) when all of a certain set of conditions are met. For example, if the gear lever is in DRIVE, the brake pedal is pressed, the accelerator pedal is released, and the vehicle speed is zero, the engine 102 may be automatically stopped. Another condition that may be included in this set of conditions is that none of the vehicle subsystems (e.g., air conditioning or power steering) require the engine to be running. In a start-stop system where all conditions are required to be met before the engine is autostopped, not only will the start-stop system inhibit the engine from being automatically stopped if any of the conditions in the set are not met, but once having been autostopped, the engine may be automatically restarted if any of the conditions change.

Continuing then with the example from above, one of the common conditions to stopping an engine is a speed of the vehicle being zero. Often, an engine will not be stopped while the vehicle is in motion. In some systems, the vehicle motion may be greater than zero, but less than a lower speed threshold such as 3 kph or 5 kph. Here, a rolling start-stop system allows the engine 102 to be auto-stopped if the speed of the vehicle is within a speed range. The speed range includes an upper threshold speed and a lower threshold speed. The lower threshold speed may be a speed at which the vehicle may be stopped using an emergency brake such as at 0 mph, 2 mpg or 5 mph. At the lower threshold speed, the voltage level threshold of the starter battery 118 is selected to provide an amount of charge needed to operate electrical vehicle components powered by the battery 118. The upper threshold speed may be a speed, associated with a voltage of the starter battery 118 indicative of a state of charge at which the electrical vehicle components including electric power steering (EPS), electric power brakes, electric stability control (ESC), and other vehicle dynamic systems may be operated while the vehicle is in motion. Along with vehicle control systems are vehicle comfort systems such as seat heaters, an air conditioning system, and a window defroster, these systems may use considerable power and may be required to be accounted for in the battery voltage calculation.

Another vehicle characteristic to consider when calculating an engine shut off point is a capacity and pressure of a vacuum reservoir used to provide brake boost vacuum assistance. The upper threshold speed may be selected from a range of speeds such as 15 mph to 60 mph. The ability of the vehicle to steer and stop is dependent upon many conditions of the vehicle including speed, weight, angle of inclination, brake conditions, road conditions, and tire conditions. As these conditions change, the ability of the vehicle to steer and stop also changes. For example, a vehicle traveling downhill is more difficult to stop than if the vehicle was traveling uphill. Therefore, a controller 120 may be configured to set a fixed lower threshold based on a lower speed to guard against a range of the conditions that affect a vehicle's stopping. Also, the controller 120 may be configured to set a fixed upper threshold based on an upper speed to guard against a range of the conditions that affect a vehicle's stopping. Alternatively, the controller 120 may be configured to dynamically change the lower threshold and upper thresholds based on the conditions of the vehicle at a point in time.

The controller 120 may also be configured to dynamically change the lower threshold and upper thresholds based on the conditions of the vehicle at a future point in time. For example, a navigation system 132 may be coupled with the controller 120 such that a route may be provided to controller. The route may include a change in elevation along the route and adjust the upper and lower speed thresholds according to the changes in potential braking along the route. The route may also include changes in posted speeds that are indicative of locations at which brakes may be applied to reduce the speed, or an accelerator pedal may be used to increase the speed. The route may include locations at which a potential stopping point is, such as static locations and dynamic locations. A static location at which a potential stopping point is, includes a traffic light, a stop sign, a round-about, or a yield sign. A dynamic location at which a potential stopping point is along the route includes locations associated with traffic congestion, weather conditions, road construction, or accidents. The route displayed by the navigation system 132 may be generated by based on map data that has been preloaded in memory of the system 132, or the system 132 may receive data streamed from a remote server. The data may be streamed wirelessly using cellular, Wi-Fi or other standard technology. Based on the route, changes in elevation, and potential stopping points along the route the controller 120 may adjust the voltage level of the starter battery 118 to maintain a state of charge of the starter battery 118 to reserve power for electrical accessories that are powered by the battery 118 including electric power steering (EPS), electric power brakes, electric stability control (ESC), and other vehicle dynamic systems.

There are conditions in which restarting may be undesirable, for example, if the operator intends to place a vehicle in PARK, and shut the engine Off, or if the operator intends to place the vehicle in NEUTRAL and remained stopped. Therefore, in at least some embodiments of the present invention, the controller 120 is configured to account for these different requirements. For example, when the engine 102 has been autostopped with the vehicle in DRIVE, and the gear lever of the transmission 104 is shifted out of DRIVE, the controller 120 may be configured to automatically restart the engine 102 under at least one condition, and to inhibit automatic restarting the engine 102 under at least one other condition.

Figure 2:
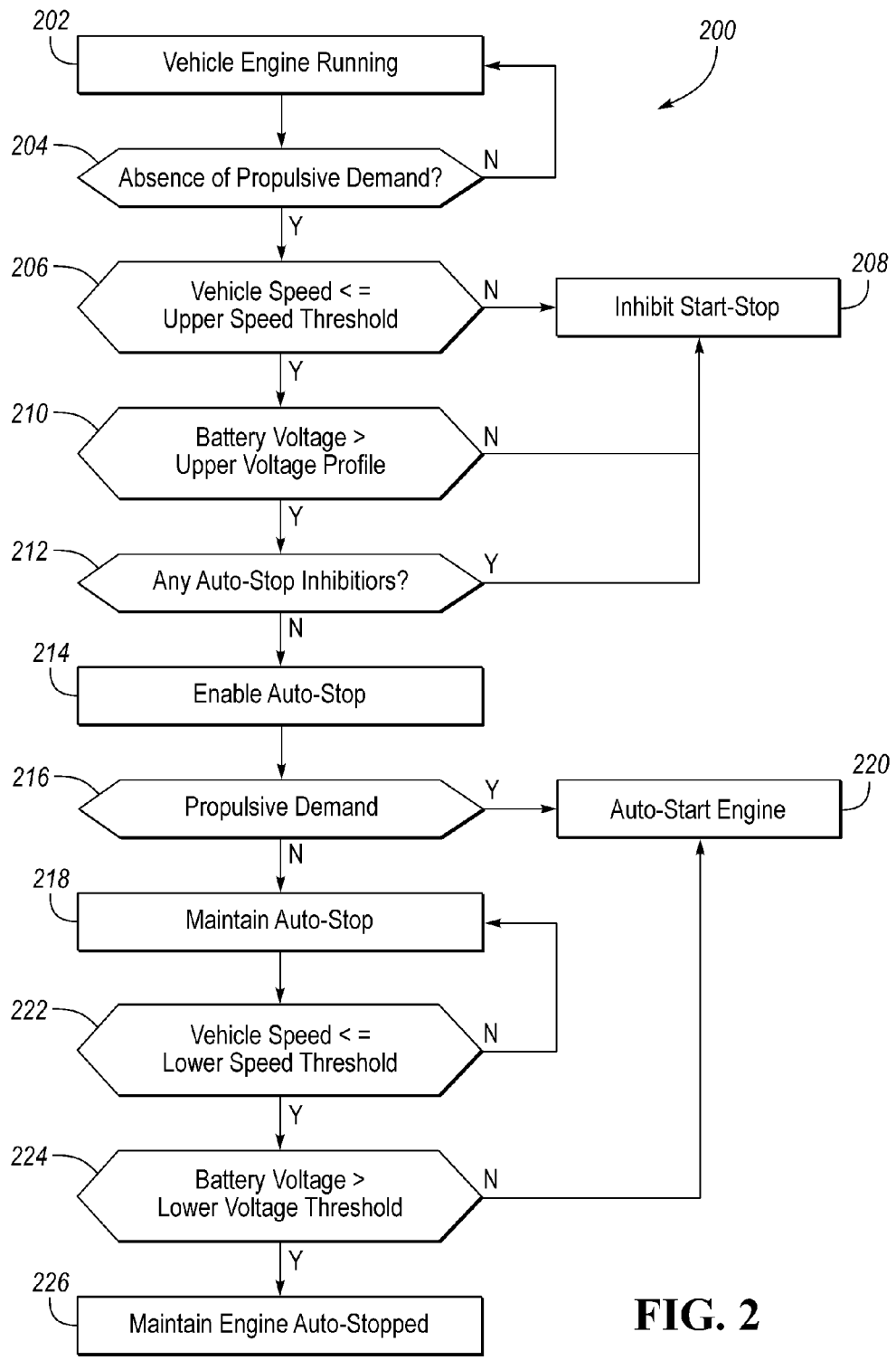
FIG. 2 is a flow diagram illustrating a method of controlling a start-stop vehicle.

Control logic or functions performed by the controller 120 may be represented by flow charts or similar diagrams, such as the flow chart 200 in FIG. 2. FIG. 2 provides a representative control strategy and/or logic that may be implemented using one or more processing strategies such as polling, event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-controlled vehicle, engine, and/or powertrain controller, such as controller 120. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices that utilize electric, magnetic, and/or optical storage to keep executable instructions and associated calibration information, operating variables, and the like.

FIG. 2 is a flow diagram illustrating an exemplary algorithm 200 for controlling a start-stop vehicle. In operation 202, the controller receives data from vehicle modules indicating the condition of the vehicle. One of the conditions is that the engine is operating while the vehicle is in an ignition on condition and the vehicle is either stopped or in motion.

In operation 202, the controller branches based on a propulsive demand. If there is a propulsive demand, the controller branches back to operation 202. A propulsive demand is a demand to provide propulsive force to the vehicle. The propulsive demand includes depression of the accelerator pedal of the vehicle, or a propulsive demand from a cruise control module. Often the propulsive demand results in a speed of the vehicle either increasing or being held constant. However, a propulsive demand may occur and the resultant vehicle speed may decrease such as a condition of a vehicle traveling up a steep hill. If there is an absence of a propulsive demand for example no external force is applied to the accelerator pedal (e.g., a driver has removed his foot from the accelerator pedal), the controller will branch to operation 206.

In operation 206, the controller receives signals from vehicle sensors, such as 128, or vehicle modules, such as the brake controller 126, a powertrain control module (PCM), a transmission control module (TCM), or an electric stability control module (ESC). The controller compares the current vehicle speed with an upper vehicle speed. If the vehicle speed is greater than the upper vehicle speed the controller will branch to operation 208. In operation 208, the controller will inhibit the start-stop feature, inhibiting the controller from auto stopping the engine. If the vehicle speed is less than or equal to the upper threshold speed, the controller will branch to operation 210.

In operation 210, the battery voltage is compared with an upper battery voltage profile. The upper battery voltage profile may be a constant voltage or the profile may vary based on vehicle conditions. For example, the upper battery voltage profile may be a function of vehicle speed, or may be a function of other vehicle characteristic including angle of inclination and weight. The function of the upper battery voltage profile with vehicle speed or other vehicle characteristics may be a linear relation, a curvilinear relation, or follow another mathematical expression. If the battery voltage is less than or equal to the upper voltage profile the controller will branch to operation 208. In operation 208, the controller will inhibit the start-stop feature, inhibiting the controller from auto stopping the engine. If the battery voltage is greater than the upper voltage profile, the controller will branch to operation 212.

In operation 212, if any auto-stop inhibitors are present, the controller will branch to operation 208. In operation 208, the controller will inhibit the start-stop feature, inhibiting the controller from auto stopping the engine. An auto-stop inhibitor is a condition in which the engine should not be auto-stopped, for example, a diagnostic mode may require the engine to continue to run and thus would be an auto-stop inhibitor. Other auto-stop inhibitors may include a temperature of the engine, a request for cabin heat, and a request for engine manifold vacuum. If there are no auto-stop inhibitors, the controller will branch to operation 214.

In operation 214, the controller enables autostop based on other criteria such as input from vehicle sensors. The signals from the sensors may be indicative of a speed of the vehicle, a force applied to a brake pedal (or absence thereof), a force applied to an accelerator pedal (or absence thereof), an angle of inclination of the vehicle, a weight of the vehicle, a mode of operation, such as a diagnostic mode, use of vehicle accessories, such as seat heaters, or air conditioning, or other vehicle characteristic. Afterwhich the controller proceeds to operation 216.

In operation 216, the controller branches based on input indicative of a propulsive demand. If a propulsive demand is determined, the controller will branch to operation 220. In operation 220, the controller will auto-start the engine. In the absence of a propulsive demand, the controller will branch to operation 218.

In operation 218, the controller will maintain the auto-stop condition and proceed to operation 222. In operation 222, the controller will compare the vehicle speed with a lower speed threshold. If the vehicle speed is greater than the lower speed threshold, the controller will branch back to operation 218. If the vehicle speed is less than or equal to the lower speed threshold, the controller will branch to operation 224.

In operation 224, the controller compares the battery voltage with a lower voltage threshold profile. If the battery voltage is less than the lower voltage profile the controller will branch to operation 220. In operation 220, the controller will auto-start the engine. If the battery voltage is greater than or equal to the lower voltage profile, the controller will branch to operation 226. In operation 226, the controller will maintain the engine auto-stopped.

Figure 3:
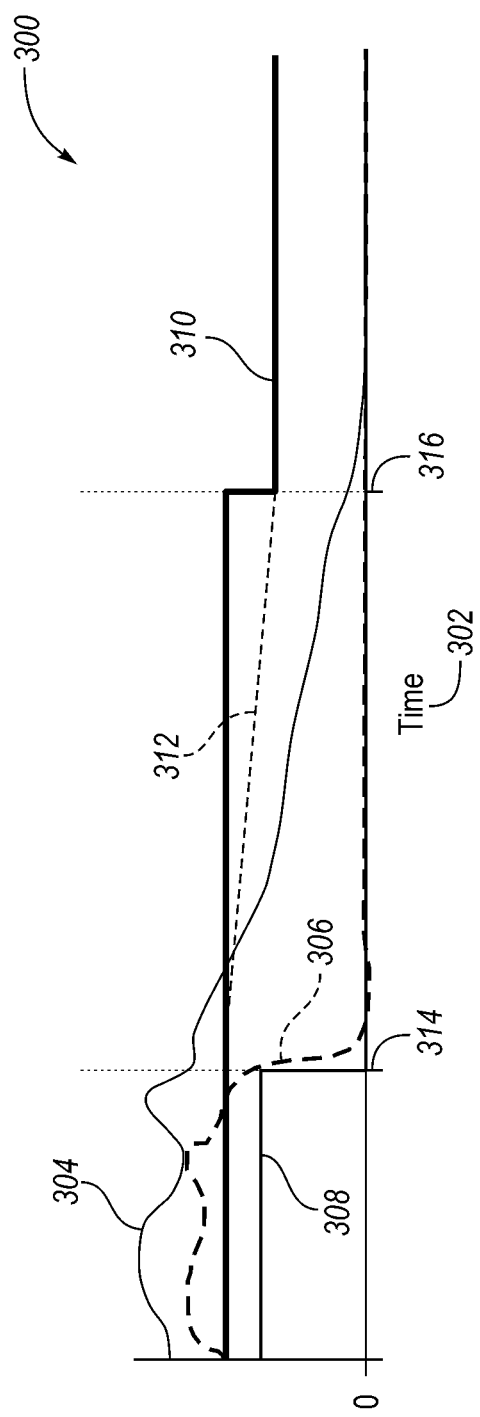
FIG. 3 is a graphical representation illustrating vehicle characteristics with respect to time.

FIG. 3 is a graphical representation 300 illustrating vehicle characteristics with respect to time 302. The vehicle characteristics include a vehicle speed profile 304, an engine speed profile 306, a brake pedal sensor signal profile 308, and a battery voltage threshold profile 310. The battery voltage threshold profile 310 may include a battery voltage threshold contour 312 that changes over a vehicle speed range having an upper threshold and a lower threshold. The upper threshold may be a static value such as a set upper speed threshold that may be based on calibrated parameters such as a gross vehicle weight rating (GVWR), or the upper threshold may be a variable based on a calculated weight of the vehicle that may include additional weight such as a trailer, or an angle of inclination of the vehicle. The lower threshold also may be a static value such as a set lower speed threshold that may be based on an ability of the vehicle to stop based on an application of an emergency brake, or an application of a gear pawl of a transmission that is engaged by shifting the transmission into park. Also, the lower threshold may be a variable.

Another aspect shown here is that the auto start-stop is not activated until the brake is applied shown here as a point time 314. Thus, the battery voltage threshold contour 312 begins at point 314 and ends at point 316 when the vehicle speed drops below the lower vehicle speed threshold. The change of the battery voltage threshold contour 312 may be a function of vehicle speed, inclination of the vehicle, or other characteristics as described above. Here, the vehicle speed profile 304 illustrates fluctuations in vehicle speed such as a vehicle decelerating to a stopping point such as a traffic light or stop sign. The corresponding engine speed profile 306 fluctuates as the propulsive demand changes, and at point in time 314, in an absence of propulsive demand and a signal indicative of an application of a brake pedal as shown from the brake sensor signal profile 308, the engine is shut off. The engine shut-off may occur when the battery voltage is above the battery voltage threshold profile 310, or the battery voltage threshold contour 312.

Basically, if the vehicle 100 is in motion and the engine 102 is stopped, the engine 102 may be automatically restarted if the operator removes his foot from the brake pedal 124 (e.g., no external force is detected on the brake pedal 124) or if the battery voltage drops below a battery voltage threshold profile 310 or battery voltage threshold contour 312. And, if the engine 102 is stopped, the engine 102 may be automatically restarted if the operator presses his foot on the accelerator pedal 122 (e.g., an external force is detected on the accelerator pedal 122) or if the battery voltage drops below a battery voltage threshold profile 310 or battery voltage threshold contour 312. Likewise, if the vehicle 100 is in motion and the engine 102 is operating, the engine 102 may be automatically stopped if the operator applies a force with his foot to the brake pedal 124 (e.g., an external force is detected on the brake pedal 124) and or the battery voltage exceeds a battery voltage threshold profile 310 or battery voltage threshold contour 312. And, if the engine 102 is operating, the engine 102 may be automatically stopped if the operator removes his foot from the accelerator pedal 122 (e.g., no external force is detected on the accelerator pedal 122) and if the battery voltage exceeds a battery voltage threshold profile 310 or battery voltage threshold contour 312.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While example embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method of controlling an engine of a vehicle comprising:
   stopping the engine by a controller in response to
   a speed of the vehicle falling within a specified range in an absence of propulsive demand, and
   a starter battery voltage being greater than a threshold that varies according to the speed.

2. The method of claim 1, wherein the threshold increases as the speed increases.

3. The method of claim 1, wherein the threshold further varies according to an angle of inclination of the vehicle.

4. The method of claim 1, wherein the threshold further varies according to a predicted weight of the vehicle.

5. The method of claim 1, wherein the threshold is indicative of a state of charge of a starter battery.

6. The method of claim 5, wherein the threshold further varies according to a predicted route and a predicted stopping point along the route such that the state of charge of the starter battery is greater than a predicted consumption of vehicle electrical components along the route to the predicted stopping point.

7. The method of claim 1, wherein the specified range has an upper and lower speed point.

8. The method of claim 7, wherein the upper speed point is greater than 40 kilometers per hour and the lower speed point is 5 kilometer per hours.

9. The method of claim 1, wherein the absence of propulsive demand is defined by depression of a brake pedal.

10. The method of claim 1, wherein the absence of propulsive demand is defined by a lack of an external force applied to an accelerator pedal.

11. A vehicle comprising:
    electric brakes;
    an engine including a starter;
    a battery having a voltage and being configured to power the starter and brakes; and
    a controller programmed to, in response to a speed of the vehicle falling within a specified range without propulsive demand and while the voltage is greater than an upper voltage that varies based on a charge needed to engage the brakes to stop the vehicle, stop the engine.

12. The vehicle of claim 11, wherein the upper voltage increases as the speed increases.

13. The vehicle of claim 11, wherein the upper voltage increases as an angle of inclination decreases.

14. The vehicle of claim 11, wherein the upper voltage further varies based on a predicted weight of the vehicle.

15. A vehicle comprising:
    an engine;
    a battery having a voltage and configured to supply power to a starter of the engine; and
    a controller programmed to, in response to a speed of the vehicle falling within a specified range in an absence of propulsive demand while the voltage is greater than an upper voltage profile that varies based on a charge needed to control the vehicle, stop the engine.

16. The vehicle of claim 15, wherein the charge needed to control the vehicle is defined by a charge needed to supply power to electric brakes.

17. The vehicle of claim 16, wherein the charge needed to control the vehicle is defined by a charge needed to supply power to an electric power steering system.

18. The vehicle of claim 17, wherein the upper voltage profile is further based on a predicted route and a predicted stopping point along the route such that a state of charge of the battery is greater than a predicted consumption of electric brakes and electric power steering along the route to the predicted stopping point.

19. The vehicle of claim 18, wherein the state of charge is greater than a predicted consumption of electric brakes, electric power steering, and an electric air conditioning system along the route to the predicted stopping point.

* * * * *